(12) United States Patent
Floury et al.

(10) Patent No.: US 10,361,984 B2
(45) Date of Patent: Jul. 23, 2019

(54) METHOD OF RESPONSE MANAGEMENT

(71) Applicant: Orange, Paris (FR)

(72) Inventors: Cedric Floury, Chatillon (FR); Aurore Catteau, Caouënnec-Lanvézéac (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/982,529

(22) Filed: May 17, 2018

(65) Prior Publication Data

US 2018/0337881 A1    Nov. 22, 2018

(30) Foreign Application Priority Data

May 19, 2017    (FR) ...................................... 17 54447

(51) Int. Cl.
*H04M 1/66*    (2006.01)
*H04M 1/68*    (2006.01)
(Continued)

(52) U.S. Cl.
CPC .............. *H04L 51/28* (2013.01); *H04L 61/15* (2013.01); *H04M 1/274508* (2013.01);
(Continued)

(58) Field of Classification Search
CPC .. H04L 51/28; H04L 61/15; H04M 1/274508; H04M 1/575; H04M 2250/60
(Continued)

(56) References Cited

U.S. PATENT DOCUMENTS 7,487,214 B2 *  2/2009  Qureshi ............... G06Q 10/107
                                                709/206
8,209,390 B1 *  6/2012  Gibbs ..................... H04L 51/28
                                                709/206
(Continued)

FOREIGN PATENT DOCUMENTS

EP         1657871 A1     5/2006
WO       2013052333 A2    4/2013

OTHER PUBLICATIONS

French Search Report and Written Opinion dated Feb. 2, 2018 for corresponding French Application No. 1754447, filed May 19, 2017.

(Continued)

*Primary Examiner* — Marceau Milord
(74) *Attorney, Agent, or Firm* — David D. Brush; Westman, Champlin & Koehler, P.A.

(57) ABSTRACT

A method for managing a communication, through a communication network, from a second individual to a first individual, in which the first individual is associated in a first database with a plurality of second addresses. A second database lists, for each of said second addresses, information relating to communications between the first and second individuals. The method includes, for a first communication intended for the second individual and arising from a first address associated with the first individual: identifying the first address; initializing a second communication intended for the first individual; selecting, according to the second database, at least one address from among the plurality of (Continued)

second addresses associated with the first individual; comparing with the first address at least one second address included in the selection of addresses; validating at least the second address; and launching the second communication to at least the second address.

11 Claims, 5 Drawing Sheets

(51) Int. Cl.
 *H04M 3/16* (2006.01)
 *H04L 12/58* (2006.01)
 *H04L 29/12* (2006.01)
 *H04M 1/2745* (2006.01)
 *H04M 1/57* (2006.01)
 *H04M 15/00* (2006.01)

(52) U.S. Cl.
 CPC ....... *H04M 1/575* (2013.01); *H04M 15/8033* (2013.01); *H04M 15/8044* (2013.01); *H04M 15/8088* (2013.01); *H04L 51/20* (2013.01); *H04M 2250/60* (2013.01)

(58) Field of Classification Search
 USPC .......................................... 455/411, 413, 418
 See application file for complete search history.

(56) References Cited

U.S. PATENT DOCUMENTS

| | | | | |
|---|---|---|---|---|
| 8,359,363 | B1* | 1/2013 | Gibbs | H04L 51/28 709/206 |
| 9,654,508 | B2* | 5/2017 | Barton | G06F 9/45533 |
| 2003/0125016 | A1* | 7/2003 | Tsuchiyama | H04M 1/274583 455/412.1 |
| 2004/0122822 | A1* | 6/2004 | Thompson | G06Q 10/10 |
| 2006/0281449 | A1* | 12/2006 | Kun | H04L 51/38 455/418 |
| 2007/0032267 | A1* | 2/2007 | Haitani | H04M 1/274508 455/556.2 |
| 2007/0161369 | A1* | 7/2007 | Vishwanathan | H04M 1/274558 455/418 |
| 2007/0240081 | A1* | 10/2007 | Grossman | G06Q 10/10 715/854 |
| 2009/0300546 | A1* | 12/2009 | Kwok | G06Q 10/107 715/825 |
| 2010/0299397 | A1* | 11/2010 | Sambrani | G06Q 10/107 709/206 |
| 2014/0032691 | A1* | 1/2014 | Barton | H04L 41/00 709/206 |

OTHER PUBLICATIONS

English translation of the Written Opinion dated Feb. 2, 2018 for corresponding French Application No. 1754447, filed May 19, 2017.

* cited by examiner

METHOD OF RESPONSE MANAGEMENT

CROSS-REFERENCE TO RELATED APPLICATIONS

This Application is based on and claims priority to French Application No. FR 1754447, filed May 19, 2017, the entire content of which is incorporated herein by reference.

FIELD OF THE INVENTION

An embodiment of the invention pertains to the field of telecommunications.

An embodiment relates most particularly to a method for managing communications through a set of services and of terminals via a communication network. The invention also pertains to the device integrating the corresponding method.

The communication network is arbitrary; for example the latter can be a telephone network, Internet network, etc.

The terminals envisaged hereinabove integrate devices through which users are able to interact via Man-machine interfaces; for example telephones, tablets, computers, work stations, etc.

TECHNOLOGICAL BACKGROUND

For several years, society has been witnessing a downtrend in the number and nature of the communication terminals used by one and the same individual: nowadays one or more telephones (smartphones, IP telephones, etc.), tablets, connected televisions, computers constitute the personal or shared electronic environment of a large number of individuals.

Connection to the others is possible at any moment, in any place and from all or some of these terminals, through various communication modes or services based on various objects such as SMS, email, voice or video call, instant message, but also message posted on social networks, etc. Access to the others by these modes of communication from any of an individual's terminals has brought about an upgrade in usages: a voice call is launched from a computer, an email is sent from their telephone, an SMS is sent from a tablet, etc.

Each individual possesses several addresses on the basis of which various interlocutors can refer in order to get in contact with him. The set of interlocutor files termed "contact files" held by an individual constitutes the electronic directory comprising the personal details of this individual's various interlocutors. For simplified management, this directory is ever more frequently being moved to the network (and no longer stored locally on each of an individual's terminals): the data and the updates of this electronic directory are then accessible from any of the individual's terminals.

In order to be contacted, an individual generally possesses several addresses per type of address (email address, telephone number, pseudonym, etc.); for example, one or more business telephone numbers, one or more personal telephone numbers, and several electronic messaging addresses, for example to partition the senders (an address for formal exchanges, an address for informal exchanges, an address for junk mail, etc.). However, an individual does not choose the address (or addresses) on the basis of which each of his interlocutors chooses to contact him.

Indeed, whilst he may sometimes control the circulation of his addresses by communicating them himself to a given interlocutor, he hardly controls, if at all, the addresses recovered "on the fly" by his interlocutors or his contacts; for example, a single electronic message sent in error from a business address may supply the contact file of his interlocutor with a new address whilst hitherto the communications between the two individuals were established exclusively through a personal address.

Reciprocally, an individual does not control the ever more numerous personal details of each of his interlocutors. When dispatching an email, the choice of the selection of an electronic address to a recipient from among the possibilities proposed by this recipient's contact file may be a source of questioning; in the case of an initiative of response to a communication of an interlocutor, the automatic input of the recipient's address used (previously sender) is now no longer evidence of a relevant direction of dispatch, from the point of view of the type of addressing or even of the address itself. And yet, the interlocutor wishes to converse with his interlocutor according to the direction which will allow him to get back in contact with the latter as efficiently as possible.

SUMMARY

For this purpose, according to a first functional aspect, there is proposed a method for managing a communication, through a communication network, from a second individual to a first individual, in which the first individual is associated in a first database with a plurality of second addresses, a second database furthermore listing, for each of said second addresses, information relating to communications between the first and second individuals, the method comprising, for a first communication intended for the second individual and arising from a first address associated with the first individual:
  an identification of the first address,
  an initialization of a second communication intended for the first individual,
  a selection, according to the second database, of at least one address from among the plurality of second addresses associated with the first individual,
  a comparison with the first address of at least one second address included in the selection of addresses,
  a validation of at least the second address, and
  a launching of the second communication to at least the second address.

The management method here described makes it possible to rectify the direction of a response, for example formulated on the basis of a notification of a communication received by an individual, doing so based on a history of communications between this individual and his interlocutor. By history of communications is meant a set of information relating to communications performed previously between an individual and his interlocutor, including the failures of hookups between the individual and his interlocutor.

Thus, the management method here described offers the advantage for any individual wishing to respond to an interlocutor, recognized and identified as contact, to sidestep the relevance or otherwise of the address used by this interlocutor during a first communication, to which communication the individual wishes to respond. By contact of an individual is meant an entity or a person whose identificatory data are stored in a database belonging to the individual. In practice, a contact's identificatory data correspond furthermore to the name, to the forename, company, postal address, etc. as well as to various addresses of this contact. Hereinafter, an address can be a telephone number, an electronic messaging address or any other identification datum used during communications between individuals through a communication network, particularly through communication services. A pseudonym is also considered to be an address relating to an individual, for example an address used as identifier in a social network.

According to a first embodiment, the second address is validated by the second individual.

Advantageously, this embodiment allows any individual to validate or to invalidate an address selected by the method, or all or part of a selection performed from among addresses. In a particular embodiment, the individual is prompted with a single proposed address. By default, if the proposed address is identical to the address entered manually by the individual or automatically by a system, the validation by the individual is not requested by the method, and automatically validated. However, a user setting makes it possible to modify this default mode.

According to a second embodiment, which may be implemented alternatively or cumulatively with those above, the second address is associated with at least one terminal of the first individual.

Advantageously, this embodiment makes it possible to designate, through the selection of an address, a given terminal. For example, if an individual initiates a message of SMS type as response to his interlocutor who previously contacted him through a voice call originating from a business landline telephone, the method can propose, as a function for example of the results of evaluating his interlocutor's response lags obtained from previous communications to this interlocutor, to redirect the message to another address associated with another terminal, for example a mobile. By response lag of an interlocutor is meant a duration between a communication sent from an individual to an interlocutor and a communication sent subsequently by this interlocutor to the individual, whatever addresses, communication modes or services or terminals are used. In a particular embodiment, the correspondence between an address and the associated terminal or terminals is signaled to the second individual. These address/terminal associations, if they are not performed by an existing device (for example an electronic directory) that the method can interrogate, they are performed by the method itself and the associated device.

According to a third embodiment, which may be implemented alternatively or cumulatively with those above, the selection is ordered on the basis of information relating to communications performed previously between the first and second individuals.

Advantageously, this embodiment makes it possible to order the addresses of the recipient of the response by prioritizing them according to one or more search criteria. The prioritization of the addresses is performed through the history of the communications performed previously between the first and second individuals: number of communications, frequencies of communication, durations of communication, times of communication, identification of the initiator of the communication, etc. In a particular embodiment, any mode of communication performed previously with the recipient is considered. A mode of communication specifies the interaction between two individuals, in particular the addresses used and the associated service or services (instant messaging, electronic messaging, but also voice calls, video calls, etc.).

According to a variant of this embodiment, the selection is performed at least on the basis of information relating to communications of the same mode as the second communication initiated.

Advantageously, this variant makes it possible to limit the selection of the addresses through a search for the communications performed previously between the first and second interlocutors according to the same mode of communication as for the second communication initiated destined for the first individual. For one and the same mode of communication, several addresses can be associated; thus, the method makes it possible, for example, to suggest to the sender of the response the electronic address last used to contact his interlocutor through the dispatching of an email. In a particular embodiment, if the mode of communication of the second communication initiated is different from the mode of communication of the first communication, the method performs a selection of addresses on the basis of information relating to the communications performed according to the two modes of communication.

According to a sub-variant of this variant, the selection is also performed according to information in respect of location of the second individual.

Advantageously, this sub-variant makes it possible to guide the sender of the response wishing to respond to an interlocutor toward a selection of addresses through a history of communications according to at least one selection criterion, that of the close location data. In an exemplary embodiment of this sub-variant, for a call sent from abroad, and identified as such in the information relating to communications previously performed, the method searches for the address most used for the communications established, for example according to a given mode of communication, for a period corresponding to a trip abroad, for example in an equivalent geographical area.

According to another sub-variant of this variant, the second address corresponds to an address used frequently between the first and second individuals.

Advantageously, this sub-variant makes it possible to prompt any individual with the address most used by the latter to contact his interlocutor, according to a given mode of communication. In a particular embodiment, the targeted communications are the communications performed solely on the initiative of the sender of the response.

According to a variant of this sub-variant, the second address corresponds to an address used frequently between the first and second individuals in a similar time slot.

Advantageously, this variant makes it possible to further limit the selection of the addresses through a search for the communications performed previously between the first and second individuals according to similar timeslots. By timeslot is meant the set of information relating to the time-stamping of an event: times identifying the start or end of communication, days, months, hours, etc. The similarity of a timeslot corresponds to the comparison of this information, according to one or more criteria. For example, a time span of a given week day can be an element of selection in the history of communications performed between the first and second interlocutors. In this document, the communications termed between two interlocutors or with an interlocutor do not herald the identity of the sender or of the recipient; likewise the multipoint communications (a sender of the communication to one or more recipients) are also considered during the communications assigned between two interlocutors.

According to another variant of the third embodiment, the selection is ordered on the basis of information relating to fruitless launches of communications previously performed to the first individual.

Advantageously, this embodiment makes it possible to select addresses according to results, for example of statistical type, formulated on the basis of the history of the communications to the recipient of the response, and in particular by considering the failures of hookups, such as those of communications in synchronous mode (time-stamping of the communications, lags between two communications, hookup failure and a new hookup attempt, etc.).

According to a fourth embodiment, which may be implemented alternatively or cumulatively with those above, if the second communication is a communication in synchronous mode and if its launch fails, a third address included in the selection of addresses is validated by the second individual, and a launch of a third communication is performed to the third address.

Advantageously, this embodiment makes it possible to optimize the user's chances of contacting his interlocutor through the establishment of a communication in synchronous mode between two individuals. By synchronous mode is meant any communication establishing the creation of a session through a communication channel for a time period initiated and closed by one or the other of the interlocutors; for example a telephone call or video-conference session. In a particular embodiment, if the third address is identical to the first address, the validation is also performed by the user.

An embodiment of the invention relates to a computer program able to be implemented on a management device comprising code instructions which, when it is executed by a processor, carries out the management method.

An embodiment of the invention relates to a data medium on which at least one series of program code instructions for the execution of the management method has been stored.

According to a hardware aspect, a management device able to manage a communication, through a communication network, from a second individual to a first individual, in which the first individual is associated in a first database with a plurality of second addresses,
a second database furthermore listing, for each of said second addresses, information relating to communications between the first and second individuals, the device comprising, for a first communication intended for the second individual and arising from a first address associated with the first individual:
   an identification module able to identify the first address,
   a selection module able to select, according to the second database, at least one second address from among the plurality of second addresses associated with the first individual,
   an obtaining module able to obtain the validation of at least the second address selected from among the plurality of the second addresses associated with the first individual.

By integration of the method of an embodiment of the invention, the management device allows in particular an individual a selection of one or more addresses for contacting an interlocutor so as to propose the best address of his interlocutor in the light of the history of the communications performed previously between the individual and his interlocutor.

One or more embodiments of the invention will be better understood on reading the description which follows, given by way of example and with reference to the appended drawings in which:

DETAILED DESCRIPTION OF ILLUSTRATIVE EMBODIMENTS

In the description detailed hereinafter of embodiments of the invention, numerous specific details are presented to afford a more complete understanding. Nonetheless, the person skilled in the art may appreciate that embodiments may be realized in practice without these specific details. In other cases, well-known characteristics are not described in detail so as to avoid needlessly complicating the description.

Figure 1:
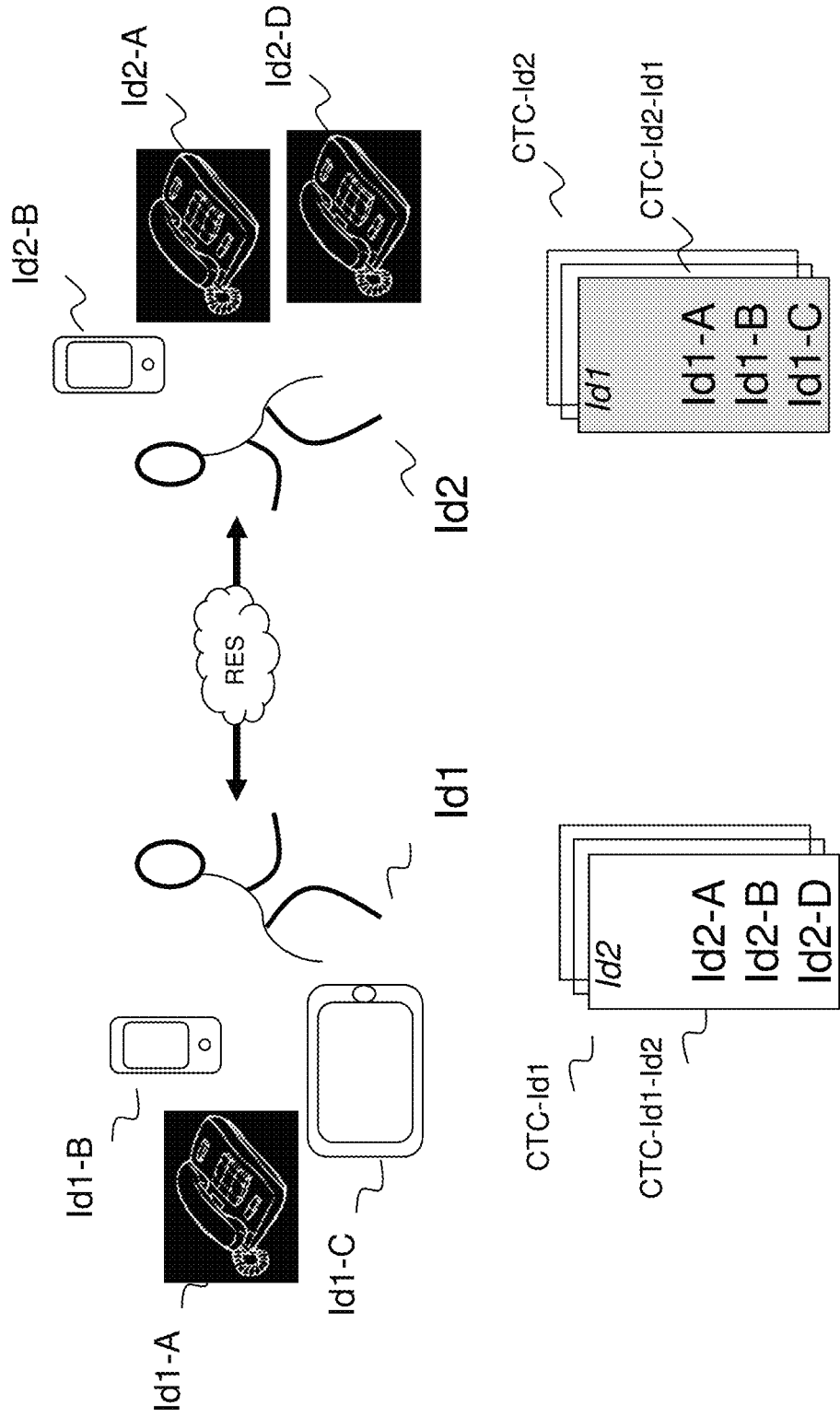
FIG. 1 illustrates an environment in which the method here described is implemented.

FIG. 1 illustrates in a schematic manner an environment of implementation of the management method here presented. Two identities Id1 and Id2, representative of two individuals, communicate via one or more communication networks RES through their various terminals: the individual Id1 possesses a mobile telephone referenced Id1-B, a landline telephone at the office Id1-A, and a tablet Id1-C. In a particular embodiment, the two individuals Id1 and Id2 exchange with one another through the communication modes mainly of voice, text and video type, through the various services accessible on the basis of these terminals such as telephone services, communication applications or software such as instant messaging or videoconferencing software, etc. In the same manner, the individual referenced Id2 possesses a mobile telephone referenced Id2-B and two landline telephones Id2-A (home) and Id2-D (office).

In this embodiment, the individuals Id1 and Id2 possess respectively the personal details of the individuals Id2 and Id1 in memory in one or more of their respective terminals. Thus the list of personal details of each interlocutor, also called a contact, of the individual Id1 is represented by the element CTC-Id1 and contains in particular the personal details of the interlocutor Id2 referenced through an element CTC-Id1-Id2. Alternatively, the data grouping together the set of personal details held by an individual are data stored in a space, for example a virtualized space, which is accessible from any of this individual's terminals. An on-line virtual storage system is widely extended so as to respond to this need for centralization of the personal data accessible from any terminal.

In this particular embodiment, the elements called "contact files" and referenced CTC-Id1-Id2 and CTC-Id2-Id1 contain respectively destination addresses at the various terminals of Id2 and of Id1. By destination addresses is meant any element making it possible to perform a communication, whatever the nature of the latter, to the associated terminal. In particular, a destination address at a terminal may be a telephone number relating to a mobile telephone. In this particular case, this telephone number makes it possible to call the mobile telephone or else to dispatch a text, audio or video message. Alternatively, the addresses contained in the contact files are not necessarily associated with terminals.

Figure 2:
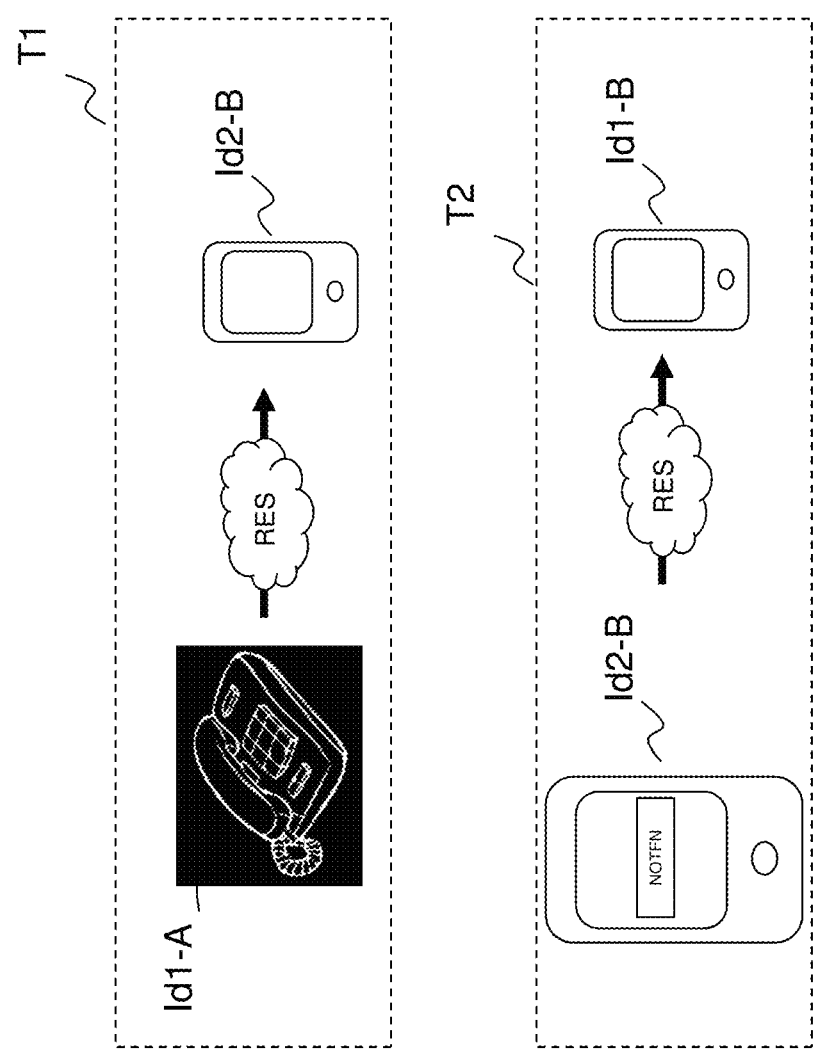
FIG. 2 illustrates an exemplary embodiment of a device here described integrated into items of communication equipment.

FIG. 2 illustrates a particular embodiment of the method here described. At an instant T1, the individual Id1 calls from the landline telephone of his office Id1-A the individual Id2 on his mobile telephone Id2-B so as to forewarn him that he is leaving his office in order to collect the children from school. The individual Id2, not available to receive this call, does not notice the call but becomes aware thereof on his mobile telephone Id2-B a few minutes later, through a notification NOTFN notifying this call.

At the time T2, the individual Id2 interacts with the notification of the message and selects the functionality relating to the drafting of an SMS to respond to this opposite party Id1. At the moment of dispatching the drafted SMS, the method of an embodiment of the invention advises the individual Id2 that the dispatch, initially planned to the office landline telephone (since the system has automatically picked up the reference of the terminal used by Id1-A), would be more relevant to the mobile telephone Id1-B. The individual Id2 validates this proposal through the user interface of his portable telephone Id2-B. Alternatively, the method proposes a more relevant terminal to the individual Id2 as soon as the functionality relating to the drafting of an SMS is selected.

Figure 3:
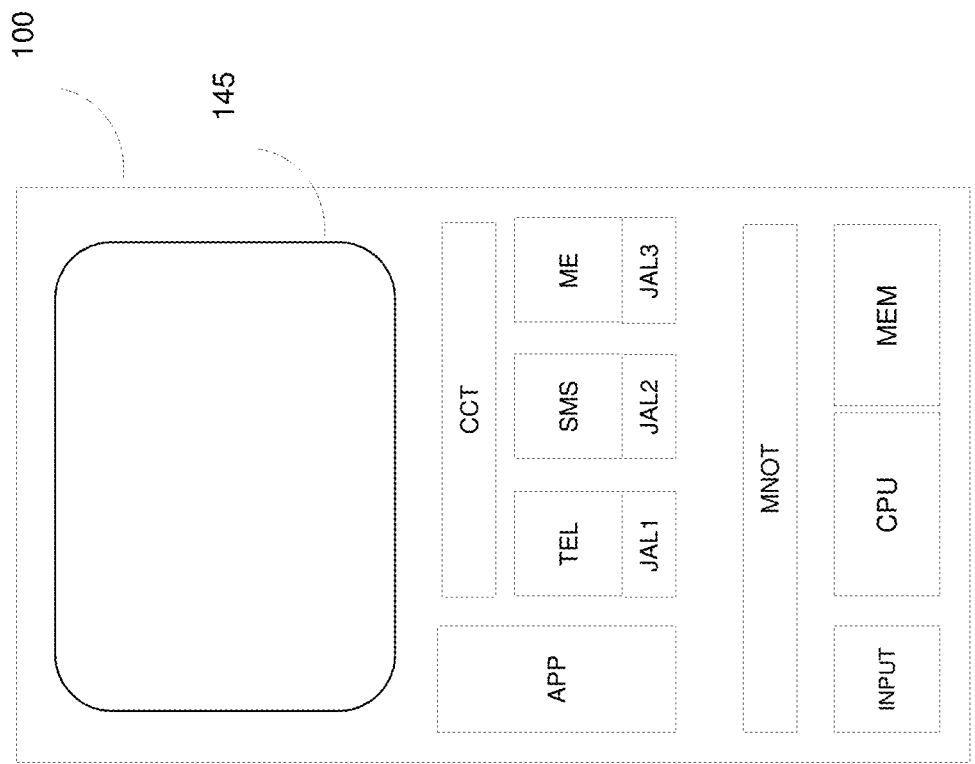
FIG. 3 illustrates a item of communication equipment into which a management device here described is integrated.

FIG. 3 illustrates a item of communication equipment in which a management device APP here described is integrated.

In the description which follows, the item of communication equipment is illustrated as a mobile device 100. The mobile device 100 comprises a display device 145, a processor CPU, an input device INPUT and a management device APP. The user interaction and the manipulation of the rendition of the device on a graphical interface can be obtained by using the display device 145, which in our example is a touchscreen coupled functionally to the processor CPU controlling the interface displayed. The input device INPUT and the display device 145 are thus merged. Certain mobile devices 100 may also exhibit an input device INPUT such as a keypad.

The processor CPU can control the rendition and/or the display of the graphical interface on the display device 145 as a function of the type of applications, native or third-party applications. The processor CPU can also manage the user inputs according to the present method. The touch-panel 145 can be viewed as an input device allowing interactions with a finger of a user or other devices such as a stylus. The tactile sensor interface or the touch-panel 145 can include any appropriate circuit for converting the analog signals corresponding to the tactile input received on its surface into any appropriate digital tactile input datum. Tactile input data such as these can, for example, be used to perform selections of parts of the graphical interface of an application. The input received from the contact of a user is sent to the processor CPU. The touch-panel 145 is configured to detect and signal the site of the contact point to the processor CPU, which can interpret the buttons in accordance with the application and with the graphical interface in progress.

The communication applications TEL, SMS and ME are respectively applications, often native, relating to telephone services (TEL), instant messaging services (SMS) and electronic messaging services (ME). Alternatively, other communications services, for example through applications relating to social networks, can be considered. In this exemplary embodiment, we shall limit the description of the method to the three modes of communication, namely telephone calls, SMSs and electronic messages also called emails.

These applications are supplied in particular with data provided by databases constructed through the applications, called source applications, such as an electronic directory constructed by an individual: an application CCT illustrates this directory listing the set of identificatory data, called contact files, of an individual's contacts.

In a particular embodiment, it is considered that each of these source applications constitutes a database relating to a history of the communications established according to the communication mode relating to the application: the applications TEL, SMS and ME thus respectively possess an associated database JAL1, JAL2 and JAL3. Alternatively, one or more common databases list histories of communications performed from one individual to a second individual, and vice versa, through one or more items of communication equipment, whatever the mode of communication.

An application module MNOT, generally installed natively in the operating system of the mobile device 100, is in particular dedicated to the display of the notifications arising from the operating system itself, but also arising from the applications installed on the device 100. Through these notifications, the user can be informed of any event that must or may be brought to his attention (state of the battery, receipt of an email, etc.). The user interaction with a graphical component relating to a notification arising from one of the applications TEL, SMS or ME allows in particular the user of the mobile device 100 to directly access one or more of the functionalities of the corresponding application, generally according to a contextualized display.

In one embodiment, the management device APP relating to the method here described communicates with the communication applications TEL, SMS and ME, and the application CCT.

In one embodiment, a user wishes to respond efficiently to a communication received but not honored: it selects the caption relating to the communication received so as to respond to it. In a particular embodiment, the mode of communication used by his interlocutor and/or according to the address used by the latter are picked up by the corresponding application; indeed, the user interacts with a notification or launches the communication application directly. In the first case, the application MNOT causes the launching of the application, or, in the second case, the launching of the application by the user allows for example the latter to access the history of the communications.

When the user validates the dispatching of his response on the basis of a communication application, the management device APP is then interrogated by the communication application so as to verify the relevance of the direction of the response. The management device APP identifies a new direction address for the communication, in the light, at one and the same time, of the search performed through the contact file stored in the application CCT containing the addresses of the interlocutor Id1, and through the information stored in one or more of the databases JA1, JA2, JA3 relating to the communications performed with the interlocutor Id1.

In a particular embodiment, the method prompts the user with the address most used by the user Id2 to contact his interlocutor Id1 in the communication mode initiated.

Figure 4B:
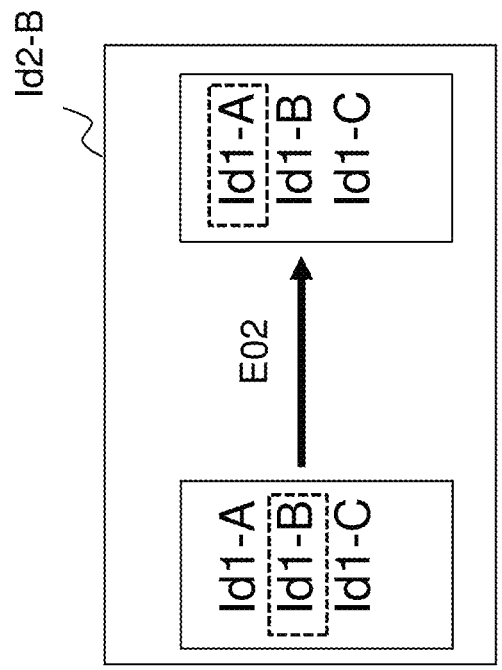
FIG. 4b schematically illustrates a key step of the method here described.
Figure 4A:
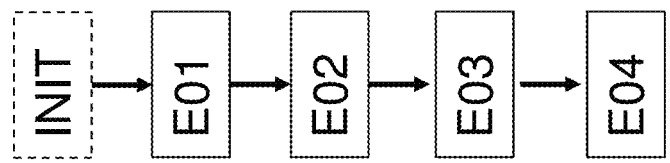
FIG. 4a illustrates the steps of the method here described.

FIG. 4a illustrates steps of the management method according to a particular embodiment of the management method.

During an initialization step referenced INIT, an individual is notified by his terminal of a call or of a message received from a first individual. This notification is performed in particular by the displaying of a message such as the element NOTFN of FIG. 2. In this embodiment, the identification of the sender is performed by the individual by virtue of the recording performed previously in his electronic directory.

During a step E01, the individual then wishes to call his interlocutor back through a videophone service: he initiates a response by keying in (or selecting through the data of his contact file) a telephone number and by ordering the launch of the communication to this address.

During a step E02, the method launches a search for telephone numbers of his interlocutor in his possession in his electronic directory according to the history of the communications performed between these two interlocutors. In a particular embodiment, this method orders the history of the video calls previously established with this interlocutor, as a function of selection criteria fixed by default by the management device (for example according to a similar timeslot). Alternatively, the user can access the settings of this management device.

During a step E03, the method prompts the individual to modify the destination address, in the light of the criterion for selecting the number most often used to call this interlocutor by a video call. The individual validates, through the interface, this redirection.

During a step E04, the communication application launches the video call according to the validated address.

FIG. 4b schematically illustrates step E02 described in FIG. 4a.

In one embodiment, the individual Id2 uses his mobile Id2-B (cf. FIG. 1) integrating the management method. At the end of the step INIT, the method identifies the address Id1-B used by his interlocutor Id1. During step E01, the individual Id2 initiates a response toward this interlocutor Id1. In step E02, when the individual Id2 launches the communication to the address Id1-B, the management method launches. In one embodiment, a second address Id1-A, associated with the interlocutor Id1, is proposed. The individual Id2 validates this choice in step E03 and the communication launches in step E04 to the address Id1-A.

Figure 5:
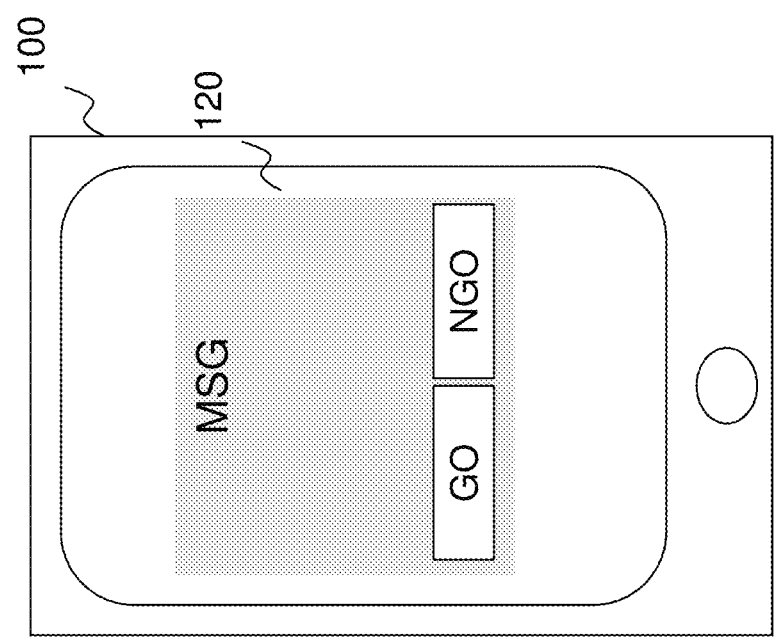
FIG. 5 illustrates a user interface representing a key step of the method here described.

FIG. 5 illustrates a user interface representing a key step of the method here described.

In one embodiment, the method selects a second address, different or identical to a first address proposed automatically by the communication application. The method then displays on the graphical interface of the mobile device 100 of FIG. 5 a graphical element called a dialog box (120), allowing the user to validate or to invalidate the address proposed by the method. Validation by selecting the element referenced GO causes the disappearance of the graphical element 120 and the launching of the communication in the direction of the second address. Invalidation by selecting the element referenced NGO also causes the disappearance of the graphical element 120 and the launching of the communication in the direction of the first address. In a message MSG addressed to the user of the mobile device 100, the first and the second address are for example mentioned, as well as the destination terminal according to the relevance of this item of information.

In the present text, the devices or modules may be implemented in software form, in which case it takes the form of a program executable by a processor, or in hardware form, such as an application specific integrated circuit (ASIC), a system on chip (SOC), or in the form of a combination of hardware elements and applications, such as for example an application program intended to be loaded and executed on a component of FPGA (Field Programmable Gate Array) type.

An exemplary embodiment of the invention offers a solution not exhibiting the drawbacks of the prior art.

Although described through a certain number of detailed exemplary embodiments, the method proposed and the object for the implementation of the method comprise different variants, modifications and enhancements which will appear in an obvious manner to the person skilled in the art, it being understood that these different variants, modifications and enhancements form part of the scope of the invention, such as defined by the claims which follow. Moreover, different aspects and characteristics described hereinabove can be implemented together, or separately, or else substituted for one another, and the set of the different combinations and sub-combinations of the aspects and characteristics form part of the scope of the invention. Furthermore, it may be that certain devices and objects described hereinabove do not incorporate the totality of the modules and functions described in respect of the preferred embodiments.

The invention claimed is:

1. A method for managing a communication, through a communication network, from a second individual to a first individual, in which the first individual is associated in a first database with a plurality of second addresses, a second database furthermore listing, for each of said second addresses, information relating to previous communications that have been launched between the first and second individuals,
    said method being performed by a management device and comprising, for one of said previous communications being a first communication intended for the second individual and arising from a first address associated with the first individual, the following acts:
    selecting, according to the second database, of at least one second address from among the plurality of second addresses associated with the first individual,
    said at least one second address selected being associated in the second database with at least one terminal of the first individual,
    comparing with the first address of said at least one second address selected,
    validating said at least one second address selected, and
    launching a second communication to said at least one second address selected.

2. The method for managing a communication from a second individual to a first individual according to claim 1, in which said at least one second address selected is validated by the second individual though the management device.

3. The method for managing a communication from a second individual to a first individual according to claim 1, in which the selecting is ordered on the basis of information relating to communications performed previously between the first and second individuals.

4. The method for managing a communication from a second individual to a first individual according to claim 3, in which the selecting is performed at least on the basis of information relating to communications of the same mode as the second communication initiated.

5. The method for managing a communication from a second individual to a first individual according to claim 4, in which the selecting is also performed according to information in respect of location of the second individual.

6. The method for managing a communication from a second individual to a first individual according to claim 4, in which said at least one second address selected corresponds to an address used frequently between the first and second individuals.

7. The method for managing a communication from a second individual to a first individual according to claim 6, in which said at least one second address selected corresponds to an address used frequently between the first and second individuals in a similar time slot.

8. The method for managing a communication from a second individual to a first individual according to claim 3, in which the selecting is ordered on the basis of information relating to fruitless launches of communications previously performed to the first individual.

9. The method for managing a communication from a second individual to a first individual according to claim 1, in which, if the second communication is a communication in synchronous mode and if its launch fails, a third address included in the selection of addresses is validated by the second individual, and a launch of a third communication is performed to the third address.

10. A non-transitory computer-readable data medium on which is stored at least one series of program code instructions for executing a method for managing a communication when the instructions are executed by a processor of a managing device, the communication being performed through a communication network, from a second individual to a first individual, in which the first individual is associated in a first database with a plurality of second addresses, a second database furthermore listing, for each of said second addresses, information relating to previous communications that have been launched between the first and second individuals, wherein the instructions configure the management device to perform the following acts, for one of said previous communications being a first communication intended for the second individual and arising from a first address associated with the first individual:

selecting, according to the second database, of at least one second address from among the plurality of second addresses associated with the first individual, said at least one second address selected being associated in the second database with at least one terminal of the first individual, comparing with the first address of said at least one second address selected, validating said at least one second address selected, and launching a second communication to said at least one second address selected.

11. A management device, able to manage a communication, through a communication network, from a second individual to a first individual, in which the first individual is associated in a first database with a plurality of second addresses, a second database furthermore listing, for each of said second addresses, information relating to previous communications that been launched between the first and second individuals, the device comprising:

a processor; and a non-transitory computer-readable medium comprising instructions stored thereon, which when executed by the processor configure the management device to perform, for one of said previous communications being a first communication intended for the second individual and arising from a first address associated with the first individual, the following acts:

selecting, according to the second database, at least one second address from among the plurality of second addresses associated with the first individual, said at least one second address selected being associated in the second database with at least one terminal of the first individual, obtaining a validation of said at least one second address selected from among the plurality of the second addresses associated with the first individual.

* * * * *